3,007,768
PREPARATION OF DIBORANE AND
DIHALOBORANES
Lawrence J. Edwards, Zelienople, and Richard K. Pearson, Mars, Pa., assignors to Callery Chemical Company, Pittsburgh, Pa., a corporation of Pennsylvania
No Drawing. Filed Jan. 28, 1957, Ser. No. 636,508
4 Claims. (Cl. 23—14)

This invention relates to a new method of preparing diborane, $B_2H_6$, and more particularly to its preparation from the reaction of silane, $SiH_4$, and a boron trihalide, $BX_3$.

Stock first reported diborane as a product from the pyrolysis of tetraborane in 1923. Since that time a number of investigators have sought other methods of preparation. The most important methods developed have involved the reaction of saline metal hydrides and boron compounds such as boron trihalides or the reaction of alkali metal borohydrides, $MBH_4$, with boron halides or certain non-oxidizing acids, such as HCl.

It is an object of this invention to provide a new method of preparing diborane using a new hydridic hydrogen source.

It is a more specific object to provide a new method of preparing diborane from the reaction of silane and a boron trihalide.

Other objects will become apparent from the description and claims hereinafter related.

This invention is based on the discovery that an exchange type reaction occurs between silane and a boron trihalide that produces diborane, haloboranes which dissociate to diborane and boron trihalide, and halogen substituted silanes. The reaction proceeds through the intermediate dihaloborane, $BHX_2$, which dissociates to diborane and a boron trihalide. The reaction can be expressed by the equations:

(1) 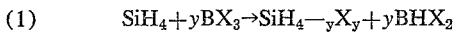
$$SiH_4 + yBX_3 \rightarrow SiH_{4-y}X_y + yBHX_2$$

where $y$ is an integer from 1 to 4 and X is a halogen, and (2) 
$$6BHX_2 \rightleftharpoons B_2H_6 + 4BX_3$$

The formation of the intermediate dihaloborane and its dissociation may be carried out either simultaneously or sequentially. When an excess of boron trihalide is used, the dissociation of $BHX_2$ is inhibited, and the $BHX_2$ can be recovered.

The reaction was carried out by placing 3.68 millimols of silane and 6.1 millimols of boron trichloride in a sealed bulb. The bulb was heated and maintained at 150 to 155° C. for 30 minutes. The bulb was then cooled to room temperature and the products were fractionated in a series of U-traps in a high vacuum system. Three consecutive traps were kept at −112° C., −131° C. and −196° C., respectively. In the −112° C. trap, 4.72 millimols of material was recovered that was predominantly unreacted $BCl_3$ which contained some $BHCl_2$. Diborane (0.102 millimol) in a mixture (2.1 millimols) of $BHCl_2$, $H_3SiCl$, and $H_2SiCl_2$ was recovered in the −131° C. trap. Unreacted silane (2.46 millimols) and 0.02 millimols of diborane were recovered in the third trap. The yield of diborane based on the silane consumed was 14.7%. In addition there was a substantial quantity of $BHCl_2$ in the condensed liquid products that was not yet disproportionated. Diborane is recovered by distillation from the other reaction products and unchanged reactants, all of which are less volatile than diborane.

By using in excess of 4 mols of boron trihalide for each mol of silane the boron-hydrogen bonded product recovered is primarily dihaloborane. For example, when 7.75 mmols of $BCl_3$ were reacted with 1 mmole of silane, in the same manner as in the above mentioned procedure, all of the boron hydrogen bonded product was $BHCl_2$. Any unreacted silane can be separated by low temperature distillation, pressure distillation, or fractional condensation. When the excess boron trihalide is removed, by fractional crystallization or by distillation, the dihaloborane disproportionates rapidly and easily to diborane and boron trihalide.

The exchange reaction to produce dihaloborane and diborane can be carried out at temperatures as low as 100° C. and as high as 200° C.

The reaction was also carried out by charging 1.79 mm. of boron trichloride and 5.21 mm. of silane to a reactor with an annular cross section. The inner wall of the reactor was maintained at 190° C., and the outer wall was maintained at 18° C. After 20 minutes the gaseous mixture in the reactor was analyzed by infra-red spectrum analysis and it was found that 36% of the boron charged was converted to diborane. Only a trace amount of undissociated dichloroborane was present. The diborane is recovered from the reaction mixture by distillation.

Since both the reactants and products will hydrolyze in the presence of water of water vapor and will oxidize in the presence of oxygen it is necessary to provide protection against hydrolysis and oxidation. This may simply be effected by conducting the reaction in a closed vessel in the manner of the above described examples. In the above described reactions the pressure of the system remained at approximately one atmosphere during the reaction and in no instance went over two atmospheres indicating that pressure is not a critical fatcor in the process.

Diborane and silane were identified and quantitatively determined by infra-red spectrum analysis in all cases. Dichloroborane and chlorosilane were identified by infra-red spectrum analysis; however, since quantitative calibrations of infra-red spectra for these compounds were not available, the analysis merely indicated the presence of relatively large or relatively small amounts of these compounds.

The exchange reaction with silane occurs in an analogous manner with other boron trihalides such as boron tribromide and boron triiodide.

Several specific modes of practicing the invention have been set forth. It should be understood that within the scope of the claims appended hereto this invention may be practiced otherwise than as specifically described.

Having described the invention and set forth several specific modes of practicing the invention, what we desire to claim and secure by Letters Patent of the United States is:

1. A method of preparing diborane comprising reacting silane and a boron trihalide using a molar ratio of at least about 1 to 1 and at a temperature between about 100° C. and about 200° C. to produce a dihaloborane, dissociating the dihaloborane, and recovering the diborane produced thereby.

2. A method according to claim 1 in which the boron trihalide is boron trichloride.

3. A method according to claim 1 in which the molar proportion of boron trihalide to silane is less than about 4 to 1, whereby the dihaloborane is substantially dissociated in situ.

4. A method of preparing dihaloboranes, $BHX_2$, where X is a halogen, that comprises reacting silane and a boron trihalide and at a temperature between about 100° C. and about 200° C., in which the mol ratio of boron trihalide to silane is in excess of about 4 to 1, and recovering the dihaloborane produced admixed with unreacted boron trihalide.

References Cited in the file of this patent

UNITED STATES PATENTS 2,900,225   Clasen _____ Aug. 18, 1959

OTHER REFERENCES

Hurd: "Chemistry of the Hydrides," 1952, pages 64–65.

Pauling: "General Chemistry," 1947, pages 543–545.

Pritchard et al.: "Chemical Reviews," vol. 55, No. 4, page 767 (1955).

Hurd: "Journal of the American Chemical Society," vol. 71, pages 20–22 (January 1949).

Taylor: "Inorganic and Theoretical Chemistry," 9th ed., 1952, pages 148–149.